United States Patent
Yamazaki

(10) Patent No.: US 6,178,442 B1
(45) Date of Patent: *Jan. 23, 2001

(54) ELECTRONIC MAIL SYSTEM AND ELECTRONIC MAIL ACCESS ACKNOWLEDGING METHOD

(75) Inventor: Nobuhide Yamazaki, Kanagawa (JP)

(73) Assignee: Justsystem Corp., Tokushima (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/868,723

(22) Filed: Jun. 4, 1997

(30) Foreign Application Priority Data

Feb. 20, 1997 (JP) .................................................. 9-036229

(51) Int. Cl.$^7$ ...................................................... G06F 15/16
(52) U.S. Cl. ............................................ 709/206; 709/203
(58) Field of Search ............................. 395/200.3, 200.35, 395/200.36, 200.37, 200.54, 200.67, 200.68; 707/500, 526; 709/200, 205, 206, 207, 224, 223, 237, 238

(56) References Cited

U.S. PATENT DOCUMENTS

| | | | |
|---|---|---|---|
| 5,057,935 | * 10/1991 | Williams . | |
| 5,325,310 | * 6/1994 | Johnson et al. | 395/200.36 |
| 5,424,724 | * 6/1995 | Williams et al. . | |
| 5,528,739 | * 6/1996 | Lucas et al. | 707/526 |
| 5,621,727 | * 4/1997 | Vaudreuil | 370/401 |
| 5,675,733 | * 10/1997 | Williams | 395/200.36 |
| 5,754,766 | * 5/1998 | Shaw et al. | 395/200.3 |
| 5,757,669 | * 5/1998 | Christie et al. | 395/200.35 |
| 5,790,790 | * 8/1998 | Smith et al. | 709/206 |
| 5,826,034 | * 10/1998 | Albal | 709/239 |
| 5,850,520 | * 12/1998 | Griebenow et al. | 709/206 |
| 5,951,648 | * 9/1999 | Kailash | 709/237 |
| 6,014,688 | * 1/2000 | Venkatraman et al. | 709/206 |

FOREIGN PATENT DOCUMENTS

| | | |
|---|---|---|
| 60-206244 | 10/1985 | (JP) . |
| 2-116239 | 4/1990 | (JP) . |
| 5-303532 | 11/1993 | (JP) . |
| 5-327762 | 12/1993 | (JP) . |
| 5-344148 | 12/1993 | (JP) . |
| 6-59992 | 3/1994 | (JP) . |
| 6-195275 | 7/1994 | (JP) . |
| 7-56837 | 3/1995 | (JP) . |
| 9-198328 | 7/1997 | (JP) . |

* cited by examiner

Primary Examiner—Mark H. Rinehart
Assistant Examiner—Marc D. Thompson
(74) Attorney, Agent, or Firm—McDermott, Will & Emery

(57) ABSTRACT

Identification information, access information indicating that a main body of a mail message has not been accessed nor read at a destination terminal, information about the sender, information about the receiver, time and date information, and subject information each collated to each other is stored and managed as a transmitted mail managing information in a mail box. When a mail message is transmitted, a transmitted mail message including a return mail program actuated to return a response, when the transmitted mail message is accessed and read at the destination terminal, an acknowledgement that the transmitted mail message has been accessed and read and identification information for the transmitted mail message as a returned mail to a server. When information as to whether the transmitted mail message has been accessed and read or not is obtained from the received return mail message, the identification information is extracted from the received return mail message and the access information for the transmitted mail message corresponding to the identification information is changed to information indicating that the transmitted mail message has been accessed and read.

16 Claims, 12 Drawing Sheets

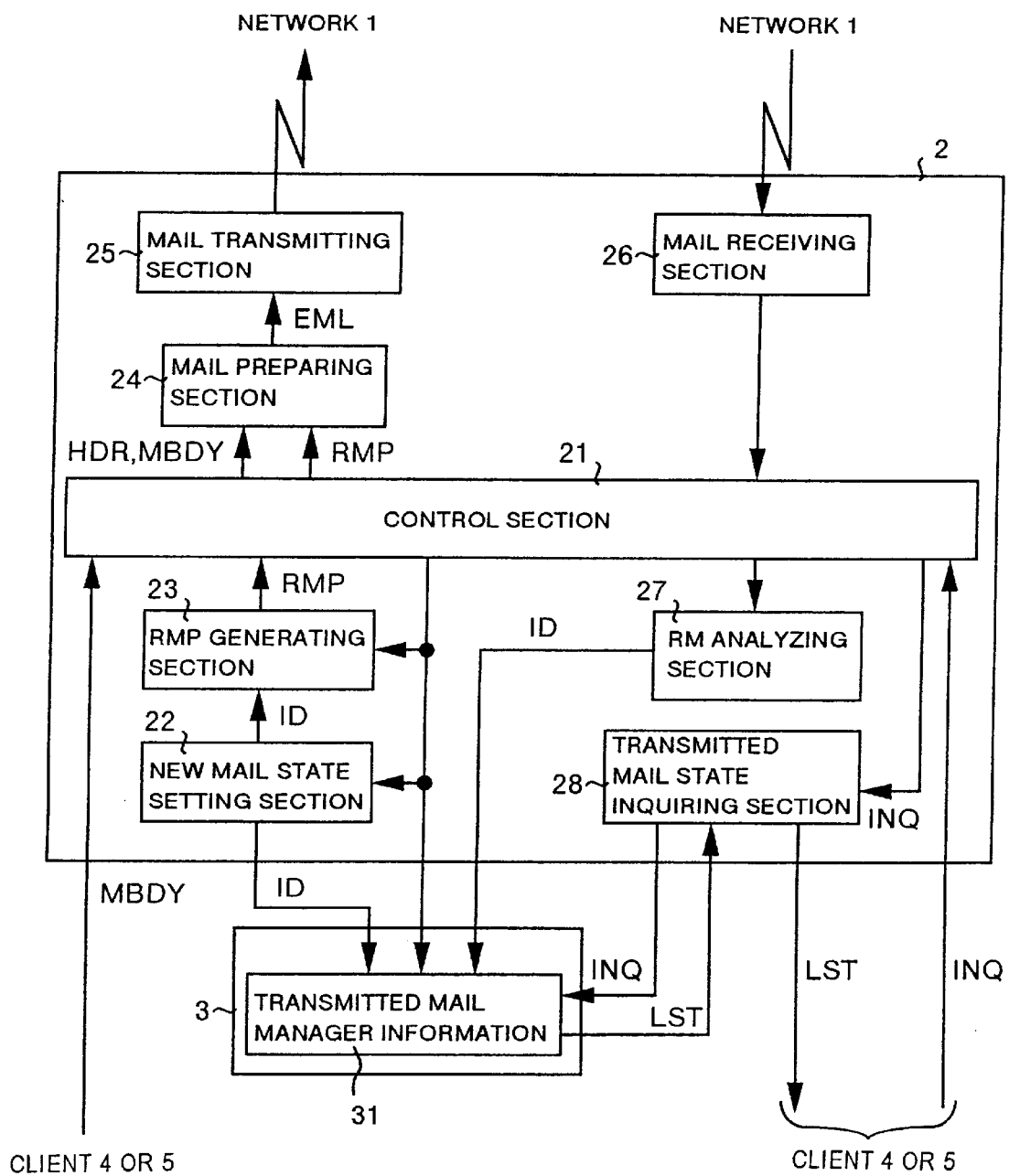

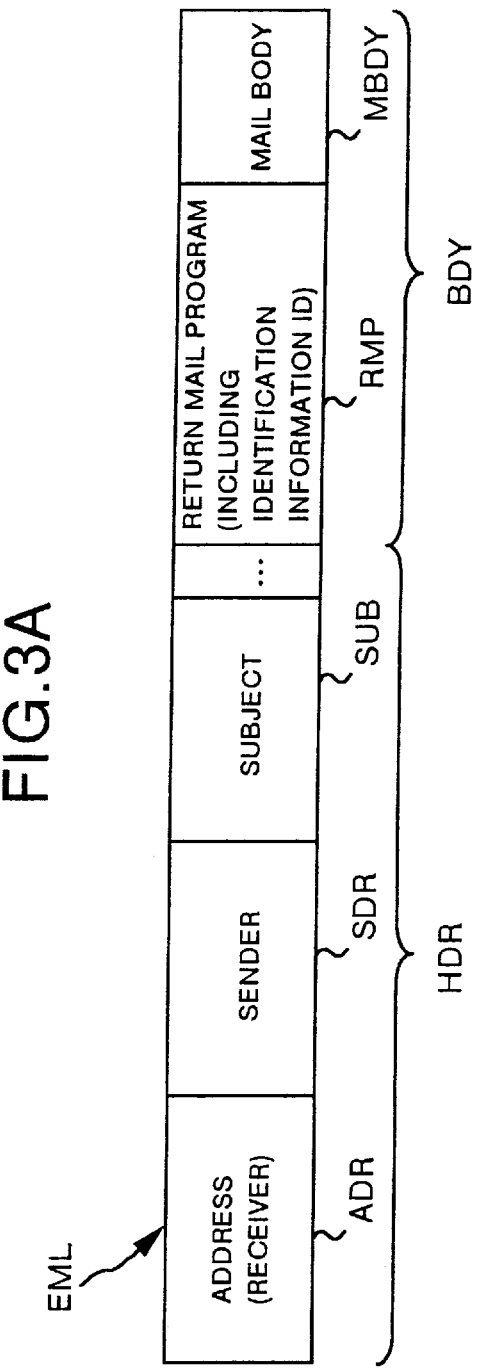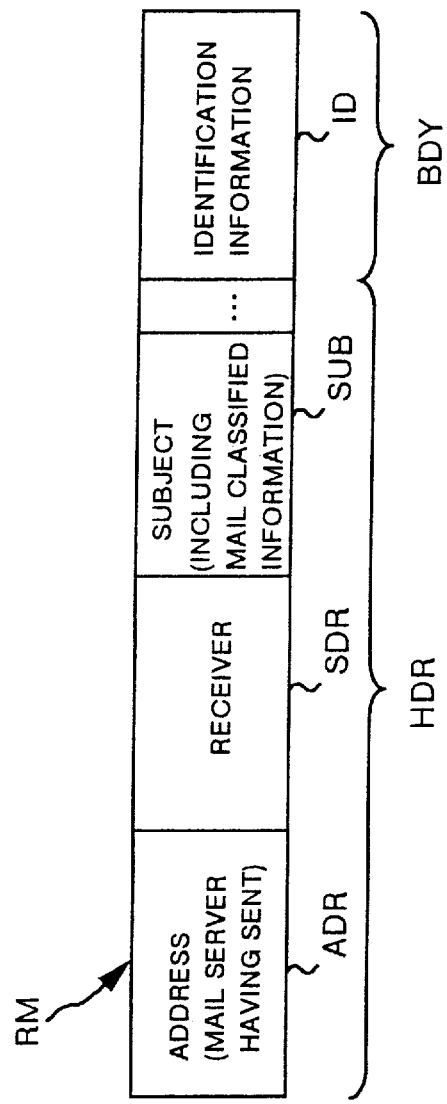

FIG.5

| IDENTIFICATION INFORMATION | ACCESS INFORMATION (0: NOT ACCESSED/ 1: ACCESSED) | SENDER | RECEIVER | TIME, DATE | SUBJECT |
|---|---|---|---|---|---|
| ID1 | 0 | C | F | 2/1 16:00 | LONG TIME NO SEE! |
| ID2 | 1 | B | E | 2/1 15:45 | HOW ARE YOU ? |
| ID3 | 0 | A | D | 2/1 15:30 | REPORT, PART 2 |
| ID4 | 1 | A | D | 2/1 14:30 | REPORT, PART 1 |
| ..... | ..... | ..... | ..... | ..... | ..... |

RESULT OF TRANSMITTED MAIL STATE INQUIRY (LST)

| ACCESS INFORMATION | RECEIVER | TIME, DATE | SUBJECT |
|---|---|---|---|
| NOT ACCESSED | D | 2/1 15:30 | REPORT, PART 2 |
| ACCESSED | D | 2/1 14:30 | REPORT, PART 1 |

ELECTRONIC MAIL SYSTEM AND ELECTRONIC MAIL ACCESS ACKNOWLEDGING METHOD

FIELD OF THE INVENTION

This invention relates to electronic mail system, and, more particularly, to an electronic mail server having a function for checking whether a transmitted mail has been accessed and read or not on a distributed type of network.

BACKGROUND OF THE INVENTION

In a mail system over a LAN (Local Area Network) in which a mail server can provide centralized control over mail transactions between client devices, it is possible for a transmitting site to check whether a receiver has received a transmitted mail or not. In a LAN, the state in which a client device in the receiving site has accessed a mail message sent to the device is regarded as the received state.

On the other hand, in a network such as The Internet using the TCP/IP protocol, the network forms a distributed type of electronic mail system, so that it is impossible to put all mail transactions on the network under centralized control.

In recent years, however, in association with technological progress in the field of the distributed type of electronic mail as described above, the technology enabling a transmitting site to check whether a receiving side has received a transmitted mail has been proposed, for instance, in Japanese Patent Laid-Open Publication No. HEI 2-116239, Japanese Patent Laid Open Publication No. HEI 6-195275, and Japanese Patent Laid-Open Publication No. HEI 7-56837. Namely, Japanese Patent Laid-Open Publication No. HEI 2-116239 discloses the technology in which, when an electronic mail is transmitted between mail servers, the transmitting site first appends to the mail message a request for returning acknowledgement of the mail and then transmits the mail message. The receiving site returns a confirmation according to the request for returning an acknowledgement when the receiving site receives the mail.

Japanese Patent Laid-Open Publication No. HEI 6-195275 discloses the technology in which, independent from the mail system, a server managing mail information is provided in each of the transmitting sites and receiving sites to execute additional functions such as enabling each server to check whether or not a transmitted electronic mail has been accessed and read. Japanese Patent Laid-Open Publication No. HEI 7-56837 discloses the technology in which, when a LAN terminal finishes transmission of data from a communication server, information indicating end of transmission is transmitted as a receiving acknowledgement message to the transmitting terminal.

In the electronic mail systems based on the conventional technology as disclosed in the patent publications described above, confirmation of receiving, namely acknowledgement that the mail has been accessed and read is sent to the transmitting site when the receiver takes an electronic mail from the server. Thus for the mail system, transmission of a mail message from the transmitting site to the receiving site is completed, but the timing for confirming that the mail has been accessed and read is not defined on the system. For this reason, it can not firmly be confirmed that a receiver has accessed and read the mail, and sometimes the state indicating that the mail is not accessed nor read may continue for a while.

Also the electronic mail system incorporating therein configuration for realizing additional functions for checking that a transmitted mail has not been accessed nor read, or that a transmitted mail has been accessed and read in a server in each of the transmitting and receiving sites respectively as disclosed in Japanese Patent Laid-Open Publication No. HEI 6-195275 described above, is suited to a small scale LAN in an in-house system. However, in a large network system such as The Internet, which is distributed over a wide area, specific functions are allocated to each server. Thus, it has not been feasible to unify all the functions with the additional functions as described above.

SUMMARY OF THE INVENTION

It is an object of the present invention to provide an electronic mail server, an electronic mail system, and a method of checking that an electronic mail has been accessed and read, and a computer-readable medium recording medium in which a program causing a computer execute the method is recorded, in which accuracy in checking that a transmitted mail message has been accessed and read in the receiving site can be made higher while reducing the necessity for upgrading of the existing system.

With the present invention, when a mail message is transmitted, the transmitted mail message has program information actuated to return, when the mail body is accessed and read at a destination terminal, an acknowledgement that the mail was accessed and read to the transmitting device. When information as to whether the mail message has been accessed and read or not is obtained from the destination terminal, the result of transmitting the mail message is stored as data indicating that the mail was accessed and read. Thus, the destination terminal is required only to access and read a main body of the mail for returning a response confirming that the mail was accessed and read. For this reason, it is not required to add any specific function for checking whether or not a transmitted mail has been accessed and read to a destination terminal or a destination electronic mail server. Accordingly, it is possible to improve accuracy in checking whether a transmitted mail has been accessed and read in the receiving site while reducing the necessity to upgrade the existing system.

With the present invention, when a mail message is transmitted, the transmitted mail message has program information actuated to return, when the main body of the mail is accessed and read at the destination terminal, acknowledgement by mail that the mail has been accessed and read as well as the identification information for the mail message to the transmitting site. When information as to whether the mail has been accessed and read is obtained from the destination terminal, the identification information is extracted from the received mail and the result of transmitting the mail message corresponding to the identification information is stored as information indicating that the transmitted mail was accessed and read. Thus, the destination terminal is only required to open the main body of the mail message for confirming that a transmitted mail has been accessed and read. For this reason, it is not necessary to add any specified function for confirming that a transmitted mail has been accessed and read to a destination terminal or a destination electronic mail server. Further an operation for distinguishing a transmitted mail message not accessed yet from a transmitted mail message already accessed is simplified according to the identification information. It is possible to have higher accuracy in checking whether a transmitted has been accessed and read or not in the receiving site with the necessity for upgrading of the existing system reduced.

With the present invention, identification information and access information indicating that a main body of a transmitted mail message has not been accessed nor read is stored at a destination terminal in correspondence to each mail. When a mail message is transmitted, a transmitted mail message has program information actuated to return, when the main body of the mail has been accessed and read at the destination terminal, an acknowledgement by mail that the mail message has been accessed and read as well as identification information for the mail message to the transmitting site is transmitted. When information that the mail has been accessed and read is obtained from the destination terminal according to the received mail message, identification information is extracted from the received mail message, and access information for the transmitted mail message corresponding to the identification information is changed to information indicating that the mail has been accessed and read. Thus, the destination terminal only needs to return acknowledgement of access opening the main body of the mail message. For this reason, it is not necessary to add any specific function for checking whether or not a transmitted mail message has been accessed and read to the destination terminal or the destination electronic mail servers. Further, for changing information indicating that a transmitted mail has not been accessed nor read to information indicating that the mail has been accessed and read is simplified by using the identification information. It is possible to improve the accuracy in checking that a transmitted mail has been accessed and read in the receiving site with the necessity of upgrading the existing system.

With the present invention, when a request for inquiring contents stored and managed is accepted from a terminal, contents corresponding to the requesting terminal is searched according to the acceptance and a search result is returned. Thus information indicating that any transmitted mail stored and managed in the system has been accessed and read can be supplied in real time.

With the present invention, program information is generated in response to a transmission request from a terminal. Thus, an operation for preparing program information is executed only when a mail message is prepared. With this feature, the system load for control other than for mail preparation can be alleviated.

With the present invention, an electronic mail server transmits a mail message having program information actuated to return, when a main body of the mail is accessed and read at a destination terminal, an acknowledgement by mail that the mail has been accessed and read to the server. When a terminal receives the transmitted mail message, the terminal executes an operation for returning a response according to the program information actuated when a main body of the transmitted mail is accessed and read. In the site of an electronic mail server, when information indicating that the transmitted mail message has been accessed and read is obtained, after a mail is transmitted, from the destination terminal according to the received mail, a result of transmission of the transmitted mail is stored as information indicating that the transmitted mail was accessed and read. Thus, the destination terminal is required for returning a response indicating that the transmitted mail has been accessed and read only to open the main body of the mail. For this reason, it is not necessary to add any specific function for confirming that a transmitted mail message has been accessed and read to the destination terminal or a destination electronic mail server. Only a small scale upgrading of the transmitting electronic mail server is required. Accordingly it is possible to improve the accuracy in checking that a transmitted mail has been accessed and read in the receiving site with the necessity for upgrading of the existing system reduced.

With the present invention, an electronic mail server transmits a transmitted mail message having program information actuated to return, when the main body of a mail is accessed and read at a destination terminal, an acknowledgement by mail that the mail message has been accessed and read as well as identification information for the mail to the server. When a terminal receives the transmitted mail message, the terminal executes, an operation for returning a response according to the program information actuated when the main body of the transmitted mail message is accessed and read. In the site of the electronic mail server, after a mail message is transmitted, when information indicating that the mail message has been accessed and read is obtained from a destination terminal according to the received mail message, identification information is extracted from the received mail message and a result of transmission of the mail message corresponding to the identification information is stored as information indicating that the mail message was accessed and read. Thus, the destination terminal is required for returning acknowledgement of access only to access and read the main body of the transmitted mail message. For this reason, it is not necessary to add any specific function for confirming that a transmitted mail message has been accessed and read to a destination terminal or to a destination electronic mail server. Only a small scale upgrade of an electronic mail server in the transmitting site is required message. Further an operation for distinguishing a transmitted mail message not accessed yet from that already accessed is simplified according to the identification information. For this reason, it is possible to improve the accuracy in checking whether a transmitted mail message has been accessed and read or not in the receiving site with the necessity to upgrade the existing system reduced.

With the present invention, an electronic mail server stores therein and manages identification information as well as access information indicating that the main body of a mail message has not been accessed nor read at a destination terminal in correspondence to each mail message. When a mail message is transmitted, a transmitted mail message has program information actuated to return, when the main body of the mail message is accessed and read at the destination terminal, an acknowledgement by mail that the mail message has been accessed and read as well as identification information for the mail to the server. When a terminal receives the transmitted mail message, the terminal executes an operation for returning a response according to the program information actuated when a main body of the transmitted mail message is accessed and read. In the site of the electronic mail server, after a mail message is transmitted, when information indicating that the mail message has been accessed and read is obtained from the destination terminal according to the received mail message, identification information is extracted from the received mail message and access information for a transmitted mail message corresponding to the identification information is changed to information indicating that the mail message was accessed and read. Thus, the destination terminal is required for returning information that the mail has been accessed and read only to access and read the main body of the mail message. For this reason, it is not necessary to add any specific function for information that the mail has been accessed and read to the destination terminal or the destination electronic mail servers. Only small scale upgrading of the electronic mail server in the transmitting site is required. Further an operation for changing information indicating that a transmitted mail message has not been accessed nor read to information indicating that the mail message has been accessed and read is simplified by using the identification information. Accordingly it is possible to improve the accuracy in checking that a transmitted mail message has been accessed and read in the receiving site with the necessity for upgrading of the existing system reduced.

With the present invention, an electronic mail server transmits a transmitted mail message having program information actuated to return, when the main body of a mail is accessed and read at a destination terminal, the acknowledgement that the mail has been accessed and read to the server. When the terminal receives the transmitted mail message, the terminal executes an operation for returning a response according to the program information actuated when the main body of the transmitted mail is accessed and read. In the site of the electronic mail server, after a mail message is transmitted, a result of transmitting mail message is stored as information indicating that the mail was accessed and read according to the acknowledgement that the mail has been accessed and read in a returned mail message. Thus the destination terminal is required for returning a response indicating that the mail message has been accessed and read only to access and read the main body of the mail message. Thus, any specific operation after a mail message is accessed and read is not required to a destination terminal or a destination electronic mail server. For this reason, it is possible to improve the accuracy in checking that a mail has been accessed and read in the receiving site with the necessity for upgrading the existing system reduced.

With the present invention, an electronic mail server transmits a transmitted mail message having program information actuated to return, when the main body of the mail message is accessed and read at a destination terminal, the acknowledgement by mail that the mail message has been accessed and read as well as identification information for the mail to the server. When the terminal receives the transmitted mail message, the terminal executes an operation for returning a response according to the program information actuated when the main body of the transmitted mail message is accessed and read. In the site of the electronic mail server, identification information is extracted from the mail message according to the acknowledgement that the mail message has been accessed and read in a mail message received after the mail message is transmitted and a result of transmission of the transmitted mail corresponding to the identification information is stored as information indicating that the mail was accessed and read. Thus, the destination terminal is required for returning a response that the mail message was accessed and read only to access and read the main body of the mail message. For this reason any specific operation for confirming that a transmitted mail has been accessed and read is not required for a destination terminal or a destination electronic mail server. Further an operation for distinguishing a transmitted mail message not accessed nor read yet from a transmitted mail message already accessed and read is simplified according to the identification information. For this reason, it is possible to improve the accuracy in checking that a transmitted mail message has been accessed and read in the receiving site with the necessity for upgrading of the existing system reduced.

With the present invention, an electronic mail server stores therein and manages identification information and access information indicating that the main body of a transmitted mail has not been accessed nor read at a destination terminal in correspondence to each mail message. When a mail message is transmitted, the electronic mail server transmits a transmitted mail message having program information actuated to return, when the main body of the mail message is accessed and read at a destination terminal, the acknowledgement by mail that the transmitted mail has been accessed and read as well as identification information for the mail message to the server. When the terminal receives the transmitted mail message, the terminal executes an operation for returning a response according to the program information actuated when the main body of the mail message is accessed and read. In the site of the electronic mail server, identification information is extracted from the mail message according to the acknowledgement that the mail message has been accessed and read in a mail message received after the mail message is transmitted. Access information for a transmitted mail message corresponding to the identification information is changed to information indicating that the mail message is accessed and read. Thus, a destination terminal is required for returning a response indicating that the mail message has been accessed and read only to access and read the main body of the transmitted mail message. For this reason, any specific operation for confirming that a transmitted mail has been accessed and read is not required for a destination terminal nor for a destination electronic mail server. Further an operation for changing the information indicating that a transmitted mail message has not been accessed nor read to the information indicating that the mail message has been accessed and read is simplified by using identification information. Accordingly it is possible to improve the accuracy for checking that a transmitted mail message has been accessed and read in the receiving site with the necessity for upgrading the existing system reduced.

Other objects and features of this invention will become understood from the following description with reference to the accompanying drawings.

BRIEF DESCRIPTION OF THE DRAWINGS

FIG. 2 is a block diagram showing an example of functional configuration of a mail server according to one embodiment of the present invention;

FIGS. 3A and 3B are views showing an example of format of an electronic mail according to an embodiment of the present invention;

FIG. 5 is a view illustrating storage and managing of a transmitted mail management information according to one embodiment of the present invention;

FIG. 12 is a view illustrating an example of a list showing a result of inquiry according to an embodiment of the present invention.

DESCRIPTION OF THE PREFERRED EMBODIMENT

Detailed description is made hereinafter for one of preferred embodiments of the present invention with reference to the related drawings.

Figure 1:
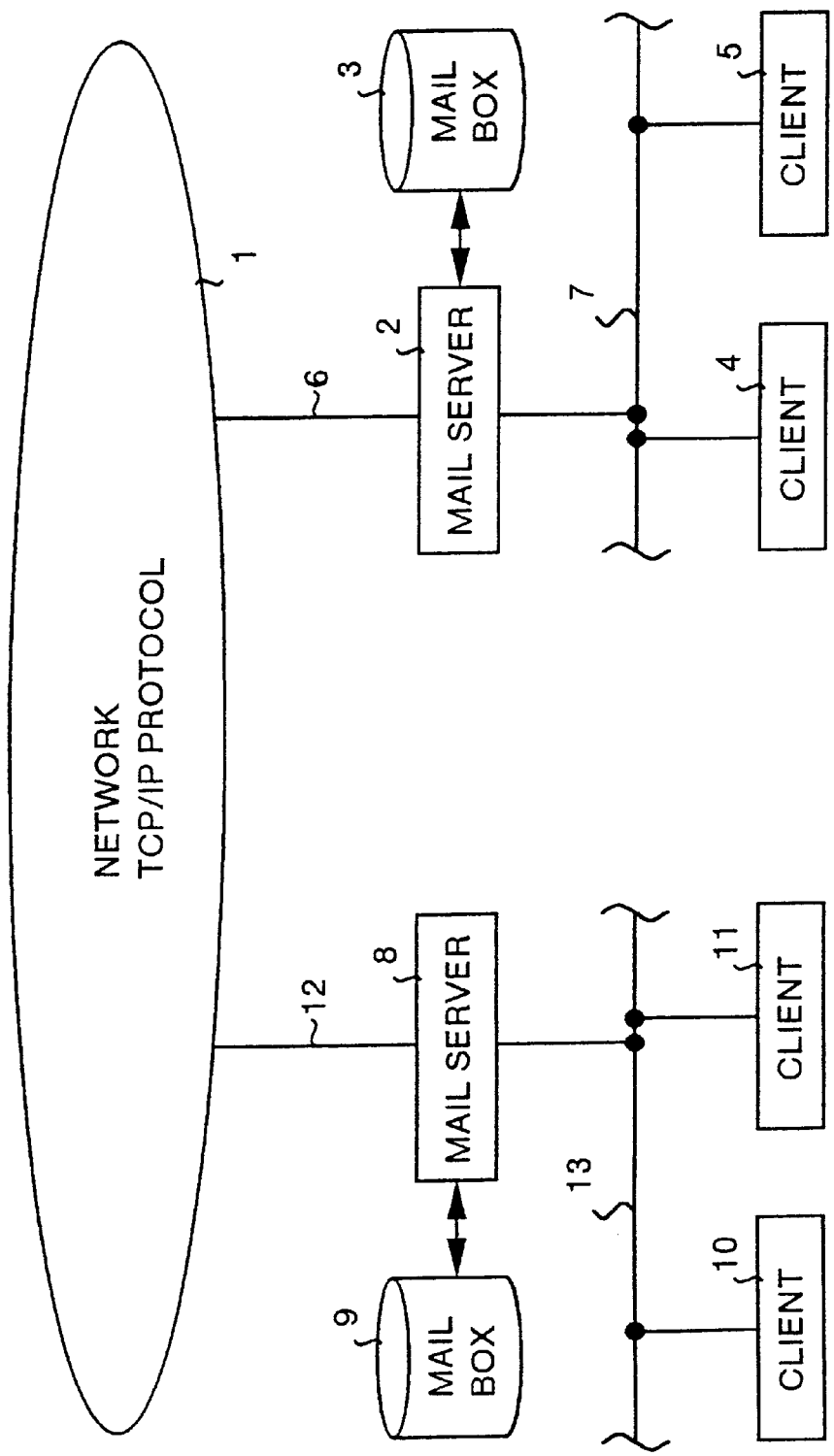
FIG. 1 is a block diagram showing an electronic mail system according to one embodiment of the present invention.

First, description is made for system configuration of the present invention. FIG. 1 is a block diagram showing an electronic mail system according to one of the embodiments of the present invention. This electronic mail system has a configuration, as shown in FIG. 1, in which a plurality of mail servers are connected to any distributed type of network (for instance, the Internet) using the TCP/IP protocol.

FIG. 1 shows mail servers 2, 8 which are used as representatives of mail servers each connected to a network 1 as an example. The mail servers 2, 8 are connected to the network 1 through transmission lines 6, 12 respectively and while mail boxes 3, 9 are connected to the mail servers 2, 8, respectively. A combination of the mail server 2 and mail box 3 and that of the mail server 8 and mail box 9 each function as an electronic mail server on the network 1. Namely, each of the electronic mail servers is a site for mail transaction on the network 1.

The mail server 2 is connected to a LAN through the transmission line 7 and executes electronic mail transactions through communications with terminals such as clients 4, 5 each connected to the LAN. Similarly, the mail server 8 is connected to the LAN through the transmission line 13 and executes electronic mail transactions through communications with terminals such as clients 10, 11 each connected to the LAN.

In the network 1 shown in FIG. 1, when an electronic mail is transmitted from the mail server 2 to the mail server 8, the mail server 2 and the mail box 3 function as an electronic mail server in the transmission side, while the mail server 8 and the mail box 9 function as an electronic mail server in the reception side.

Next description is made for functions of the mail servers. FIG. 2 is a block diagram showing the functional configuration of the mail servers according to one of the embodiments of the present invention. FIG. 2 shows the mail server 2 and mail box 3 as a typical configuration of the electronic mail server. The mail server 2, comprises, as shown in FIG. 2, a control section 21, a new mail state setting section 22, a return mail program (described RMP hereinafter) generating section 23, a mail preparing section 24, a mail transmitting section 25, a mail receiving section 26, a return mail (described RM hereinafter) analyzing section 27, and a transmitted mail state inquiring section 28.

The control section 21 is connected to the clients 4, 5, new mail state setting section 22, RMP generating section 23, mail preparing section 24, mail receiving section 26, RM analyzing section 27, transmitted mail state inquiring section 28, and the mail box 3. The control section 21 provides controls over operations for mail transactions as well as for inquiry of a mail state. The control section 21 stores transmitted mail managing information such as a receiver (a destination for transmission), a subject, a mail body MBDY or the like each included generally in the mail requested for transmission from either the client 4 or 5 in the mail box 3.

The new mail state setting section 22 sets identification information ID to be added to a mail as an object for transmission according to a request for transmission from the control section 21 and supplies the identification information ID to the RMP generating section 23 as well as to the mail box 3. It should be noted that the identification information ID is included in the transmitted mail managing information in the mail box 3.

The RMP generating section 23 generates a return mail program RMP to be added to a mail as an object for transmission according to a request for transmission from the control section 21 and supplies the return mail program RMP to the mail preparing section 24 through the control section 21. This return mail program RMP is program information actuated to return a return mail RM including acknowledgement of the access (a type of the return mail RM) as well as the identification information ID to the mail server 2 when the body of the mail has been accessed at a client as a destination for transmission. Added to this return mail program RMP is the identification information ID set in the new mail information setting section 22.

The mail preparing section 24 prepares a mail to be transmitted EML according to information including the mail body MBDY supplied from the control section 21 as well as to the return mail program RMP generated in the RMP generating section 23, and supplies the transmitted mail EML to the mail transmitting section 25. The mail transmitting section 25 transmits the transmitted mail EML supplied from the mail preparing section 24 to the mail server to which the client as a destination for transmission is connected through the network 1.

The mail receiving section 26 receives a mail sent from another mail server through the network 1 and supplies the received mail to the control section 21. The RM analyzing section 27 analyzes the received mail supplied from the control section 21 and judges whether it is a return mail RM returned according to the return mail program or not. When it is judged that it is a return mail RM, the RM analyzing section 27 further supplies identification information ID in the return mail RM to the mail box 3. The identification information ID supplied from the RM analyzing section 27 to the mail box 3 is used for verifying the identification information ID in the transmitted mail managing information previously registered in the mail box 3. The identification information ID is also used for making the verified access information in the transmitted mail managing information to an access state.

The transmitted mail state inquiring section 28 accesses, when an inquiring request INQ from either the client 4 or 5 is accepted through the control section 21, the transmitted mail managing information 31 in the mail box 3 to distribute the required list LST to the client which requested the inquiry.

Next description is made for a format of an electronic mail used for the electronic mail system according to the present invention. FIGS. 3A and 3B are views showing an examplary format of an electronic mail according to one of the embodiments, FIG. 3A shows a format of a transmitted mail, and FIG. 3B shows a format of a return mail.

A transmitted mail EML prepared by the mail preparing section 24 comprises, as shown in FIG. 3A, a header section HDR and a main body BDY. Specifically, the header section HDR comprises a format shared with existing mail systems such as address information ADR for specifying an address (receiver), sender information SDR for specifying a sender, and subject information SUB indicating the subject of a transmitted mail EML or the like. Also the main body BDY comprises a return mail program RMP including identification information ID and a mail body MBDY. Applied to this return mail program RMP on the Internet is a description language processable on any WWW (World Wide Web) browser.

A return mail RM returned according to the return mail program RMP comprises, as shown in FIG. 3B, a header section HDR and a main body BDY like the transmitted mail EML. More specifically, the header section HDR of the return mail RM comprises an address information ADR indicating the mail server having sent thereto the original transmitted mail EML as an address for transmission, receiver information SDR indicating the receiver of the original transmitted mail EML, and subject information SUB indicating the subject of the return mail RM or the like. It should be noted that mail classified information CLS indicating that a type of the mail is the return mail is included in the subject information SUB. The main body BDY of the return mail RM comprises the identification information ID included in the return mail program RMP of the original transmitted mail EML.

Figure 4:
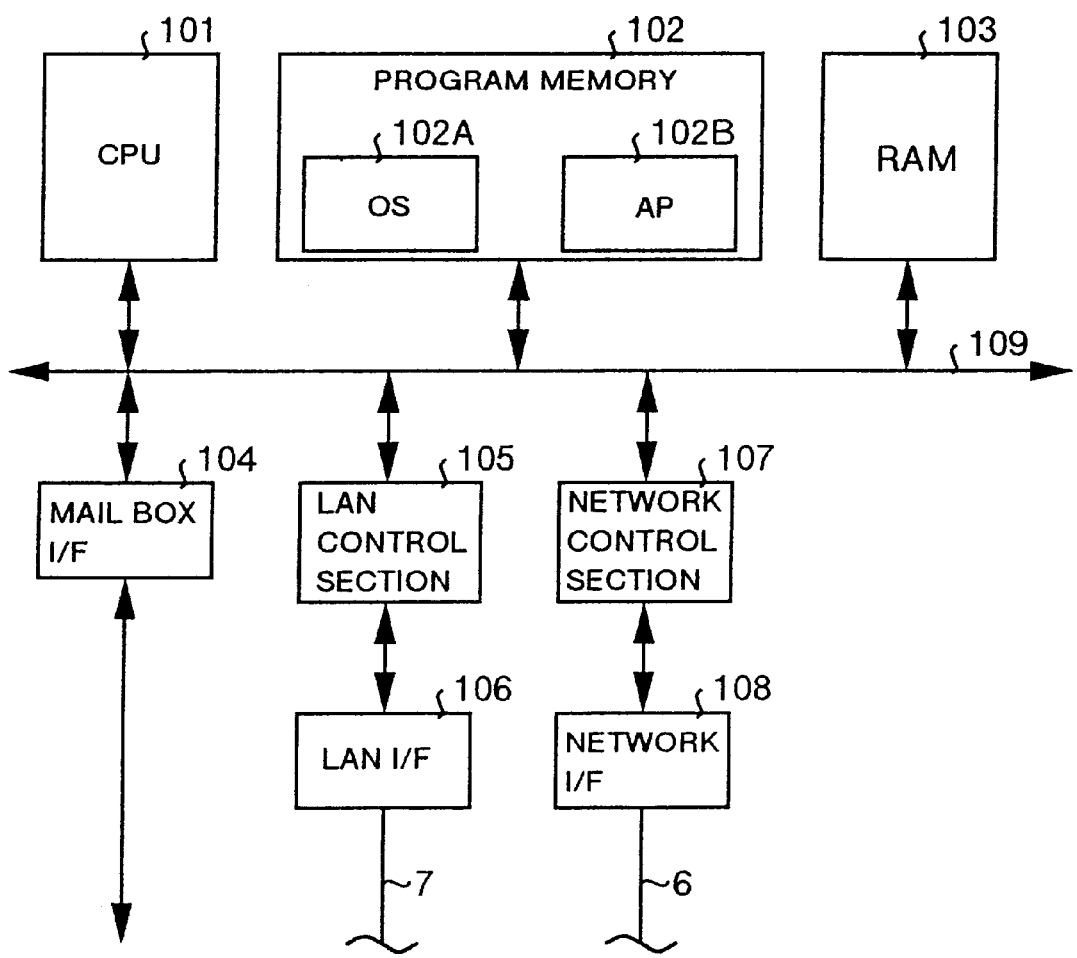
FIG. 4 is a block diagram showing an example of hardware configuration of a mail server according to one embodiment of the present invention.

Next description is made for the hardware configuration of one of the mail servers. FIG. 4 is a block diagram showing the hardware configuration of the mail server according to one of embodiments of the present invention. In this case, description of the mail server also assumes the mail server 2 as a representative. The mail server 2 connects, as shown in FIG. 4, a CPU 101 to an internal bus 109 as far as the hardware is concerned, and operates units such as a program memory 102, a RAM 103, a mail box I/F 104, a LAN control section 105, a LAN I/F 106, a network control section 107, and a network I/F 108 or the like each connected to the internal bus 109 according to controls by the CPU 101.

The CPU 101 is a unit for controlling an entire server according to a control program. The program memory 102 stores therein an OS (operating system) 102A and an AP (application program) 102B and provides various programs to the CPU 101. The RAM 103 is a memory used as a work area when each of the various programs is executed by the CPU 101.

As compared to the functional blocks shown in FIG. 2, functional blocks realized by executing various types of control programs by the CPU 101 are the control section 21, new mail state setting section 22, RMP generating section 23, mail preparing section 24, RM analyzing section 27, and transmitted mail state inquiring section 28.

The mail box I/F 104 is an interface section for executing data transactions (mail or the like) between the server and the mail box 3. The LAN control section 105 is a unit for providing control over communications between the server and the LAN, and the LAN I/F 106 is an interface section connected to the transmission line 7 for executing data (mails or the like) transaction between the server and the LAN.

The network control section 107 is a unit for providing control over communications between the server and the network 1. The network I/F 108 is an interface section connected to the transmission line 6 for executing data transactions (mail or the like) between the server and the network 1. Functional blocks implementing communications between the network control section 107 as well as the network I/F and the network 1 are the mail transmitting section 25 and the mail receiving section 26 as compared to the functional blocks shown in FIG. 2.

Next description is made for the transmitted mail managing information 31. FIG. 5 is a view illustrating storage and management of the transmitted mail managing information 31 according to the embodiment. The transmitted mail managing information 31 shown in FIG. 5 is stored in correlation to identification information, access information, a sender, a receiver, a date and a time (time of transmission), and a subject or the like. In the transmitted mail managing information 31 shown in FIG. 5, the identification information ID is information set so that any of the identification information will be different from each other such as "ID1", "ID2", "ID3", and "ID4". As described above, each of transmitted mails does not have identification information shared therewith. Namely, the identification information shared therewith is not set as transmitted mail managing information 31, whereby integral management thereof in the mail box 3 can be realized.

In the access information, a flag "0" indicating a state in which a transmitted mail has not been accessed nor read is set to a transmitted mail which has not been accessed nor read. A flag "1" indicating information that the mail has been accessed and read is set to a transmitted mail which has been accessed and read. For instance, each of the transmitted mails with identification information ID1, ID3 is still in a state in which the mail has not been accessed nor read because each of the access information is set to flag "0". On the other hand, each of the transmitted mails with identification information ID2, ID4 is in the accessed state because each of the access information is set to flag "1".

Accordingly, in the transmitted mail managing information 31 shown in FIG. 5, the transmitted mail (Identification information: ID1, subject: "Long time no see!") transmitted from a sender C to a receiver F at 16:00 on February 1 indicates that the receiver F has not accessed the mail yet. This state in which the mail has not been accessed means, strictly speaking, that the receiver F has not accessed the mail body MBDY, namely the mail body has not been displayed on a screen. In contrast, for instance, the transmitted mail (Identification information: ID2, subject: "How are you?") transmitted from a sender B to a receiver E at 15:45 on February 1 indicates that the receiver E has already accessed the mail. This access state means, strictly speaking, that the receiver E has already accessed the mail body MBDY, namely the mail body has been displayed on a screen once.

Figure 6:
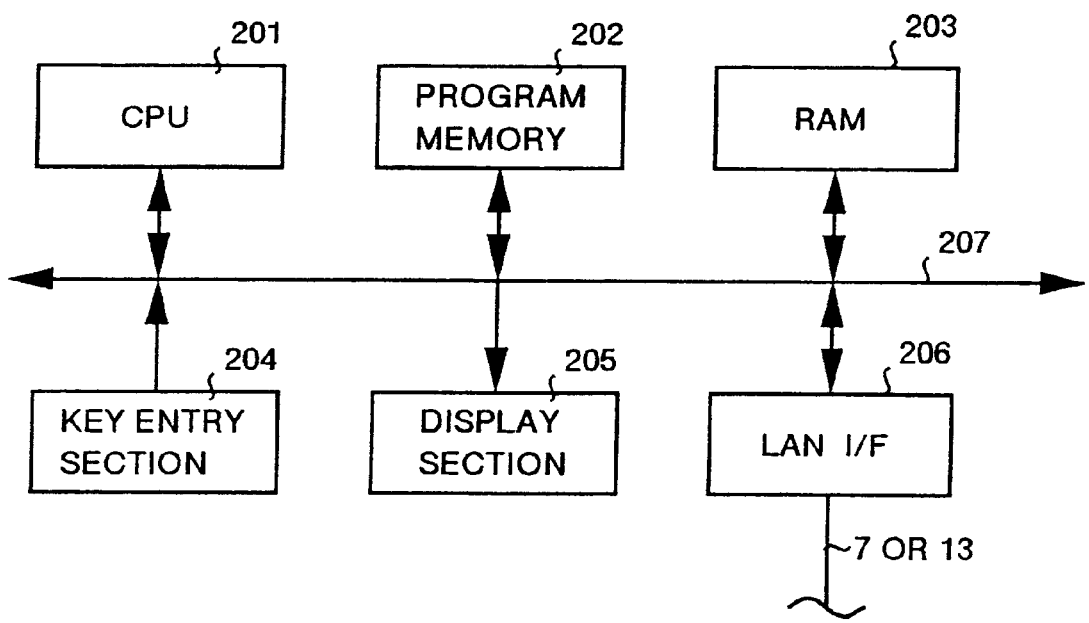
FIG. 6 is a block diagram showing internal (hardware) configuration of a client according to an embodiment of the present invention.

Next description is made for a client. FIG. 6 is a block diagram showing internal (hardware) configuration of the client according to the embodiment. FIG. 6 shows a typical configuration of the client as an example. The client shown in FIG. 5 is a terminal of a personal computer or the like.

Each of the clients 4, 5, 10, 11 comprises, as shown in FIG. 6, a CPU 201, a program memory 202, a RAM 203, a key entry section 204, a display section 205, and a LAN I/F 206 or the like. Stored in the program memory 202 is a control program for executing functions as a client, and the CPU 201 controls units such as the key entry section 204 and the display section 205 or the like each connected to the internal bus 207 according to the control program. It should be noted that the CPU 201 uses the RAM 203 as a work area when the program is executed. Herein, this CPU 201 executes data communications (mail or the like) with the LAN through the LAN I/F 206 according to control with software.

The key entry section 204 has keys or the like for operating mail preparation, mail transaction, mail inquiry, mail display or the like, and sends each signal indicating detection of any of the operations according to any key operation to the CPU 201 through the internal bus 207. The display section 205 displays a list of the received mail messages on the screen and received mail messages which have been accessed and read according to control by the CPU 201.

This client has a program for realizing a function of a WWW browser stored in the program memory 202. For this reason, when a received mail has been accessed with the key operation on the WWW browser according to execution of the program, the main body of the mail which has been accessed is displayed on the display section 205. At the same time, the return mail program RMP is automatically actuated, and a return mail RM is prepared to be returned to the transmitting terminal.

It should be noted that a series of operations until the return mail RM actuated after the operation for accessing the mail is returned is not executed according to the control program stored in the program memory 202, but that the return mail program RMP detects an ordinary operation of accessing a mail as an event and automatically returns the mail.

Figure 7:
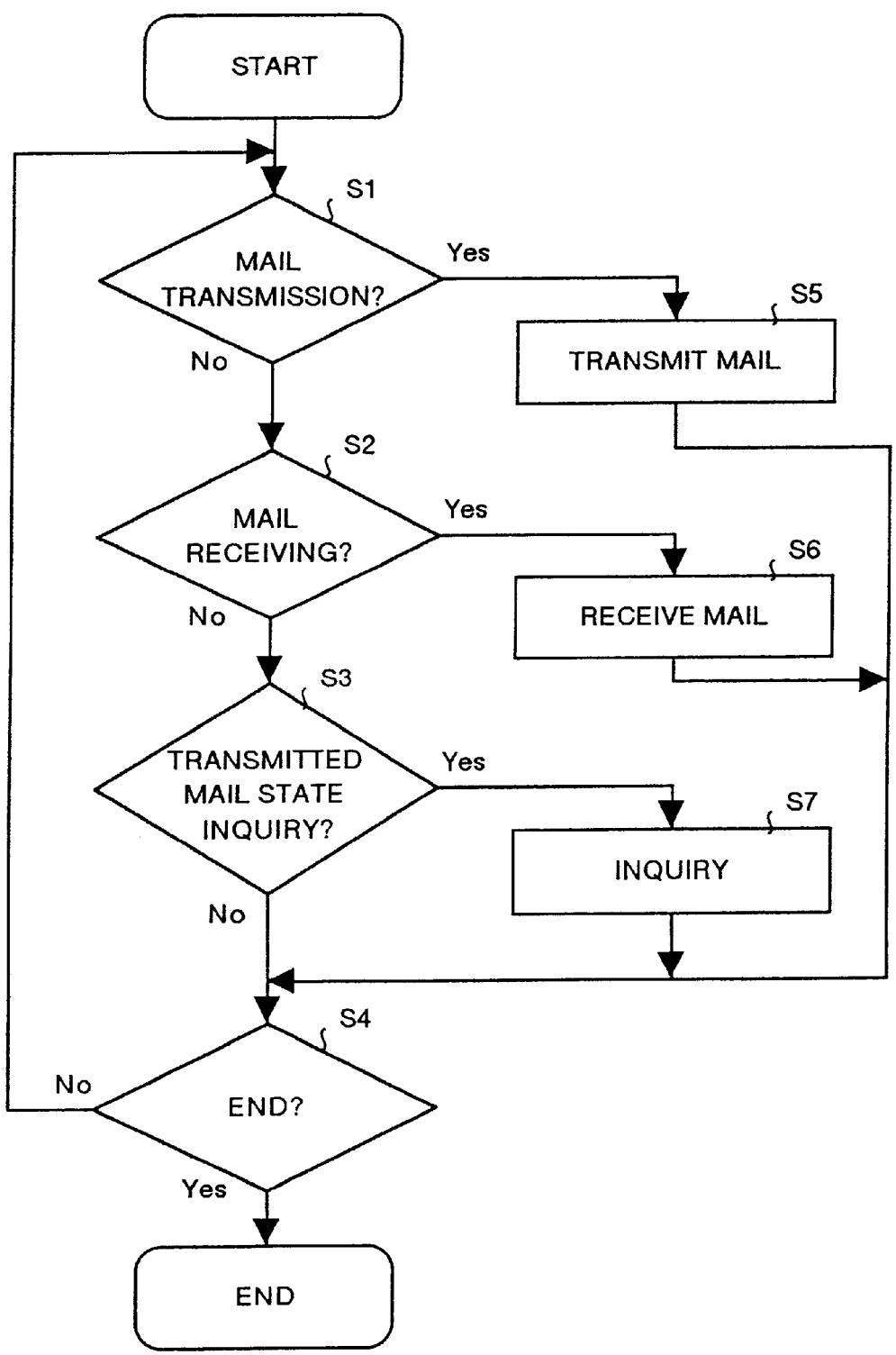
FIG. 7 s a flow chart illustrating a main operation of a mail server according to an embodiment of the present invention.

Next description is made for operations of the mail server 2. FIG. 7 is a flow chart for explanation of the main operations of the mail server 2 according to the embodiment. Operations according to the flow chart shown in FIG. 7 are controlled by the CPU 101 (control section 21) or the like and each of the operations is executed by each of the units.

In the main processing shown in FIG. 7, until an event occurs, steps for determination as to whether an event is a mail transmission or not (step S1), whether the event is a mail reception or not (step S2), whether the event is a transmitted mail state inquiry or not (step S3), or whether the event is an end of the operation or not (step S4), are repeated.

Figure 8:
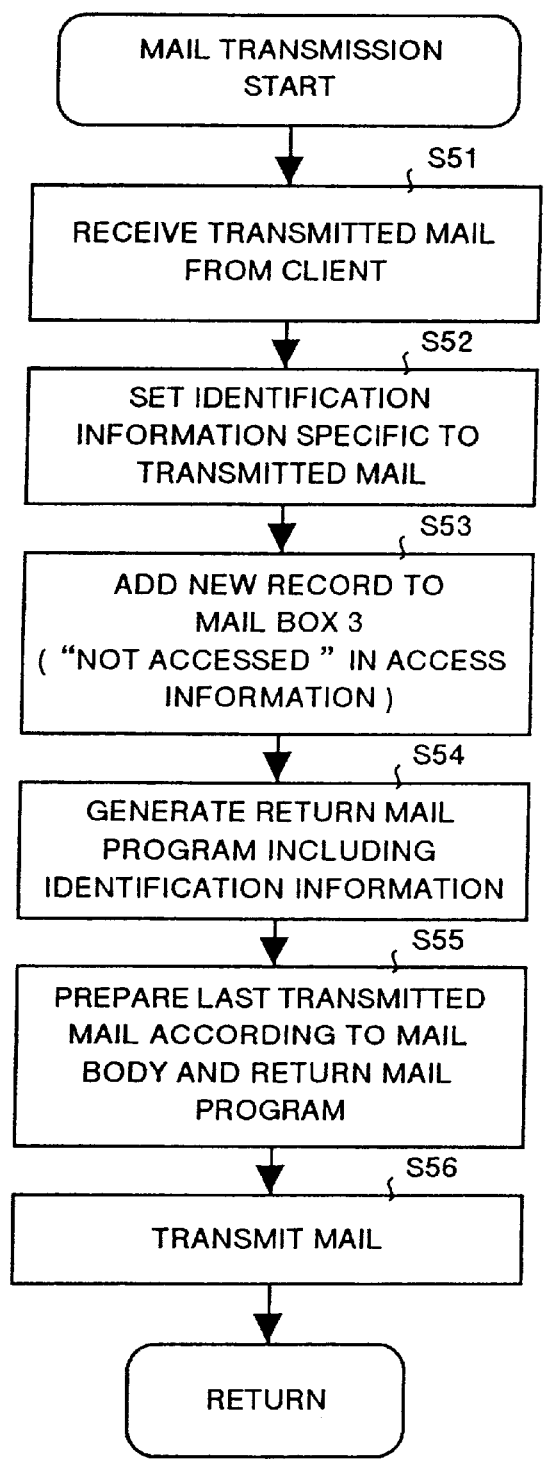
FIG. 8 is a flow chart illustrating an operation of mail transmission by a mail server according to one embodiment of the present invention.

In step S1, when a request for mail transmission is accepted from the client 4 or 5, the processing proceeds to step S5 to transmit a mail and executes mail transmission (Refer to FIG. 8 described later). In step S2, when a request for mail transmission is accepted from the network 1 (mail server 8), the processing goes to step S6 to receive a mail and executes mail reception (Refer to FIG. 9 described later). In step S3, when an inquiring request is accepted from the client 4 or 5, the processing goes to step S7 to inquire a transmitted mail state and executes inquiry (Refer to FIG. 11 described later). In step S4, when a request to end the processing of the server due to its maintenance or some other reasons is accepted, the processing ends herein.

Then description is made for transmitting operations. FIG. 8 is a flow chart for explaining an examplary mail transmitting operation in the mail server according to the embodiment. When operation of mail reception is started, at first, in step S51, a mail as an object for transmission including a mail body MBDY or the like is received from one of clients. With this reception, in step S52, identification information ID is set (new mail state setting section 22) to give the identification information specific to the mail to the current mail as an object for transmission.

Then, in step S53, transmitted mail managing information 31 concerning the current transmitted mail is stored and managed in the mail box 3 according to the identification information ID set in step S3. In this step, identification information ID, access information in which a mail is not accessed nor read, a sender, a receiver, and a subject or the like in the transmitted mail managing information 31 are determined.

In step S54, when a return mail program including the identification information ID set in step S52 is generated (RMP generating section 23), in step S55, a transmitted mail EML in a format shown in FIG. 3A is prepared (mail preparing section 24) according to a mail including the mail body MBDY as well as to the return mail program. Namely, as shown in FIG. 3A, a transmitted mail EML, comprising a header section HDR including a format shared with the existing mail systems and a main body BDY including the return mail program RMP as a characteristic section in the present invention, is prepared.

In step S56, the transmitted mail EML prepared in step S55 is sent to the mail server 8 connected to the client as a destination for transmission through the network 1 (mail transmitting section 25). A transmitted time when this mail is transmitted is set in a column for a date and a time in the corresponding transmitted mail managing information 31. After the step, the processing returns to the step for the main processing.

Figure 9:
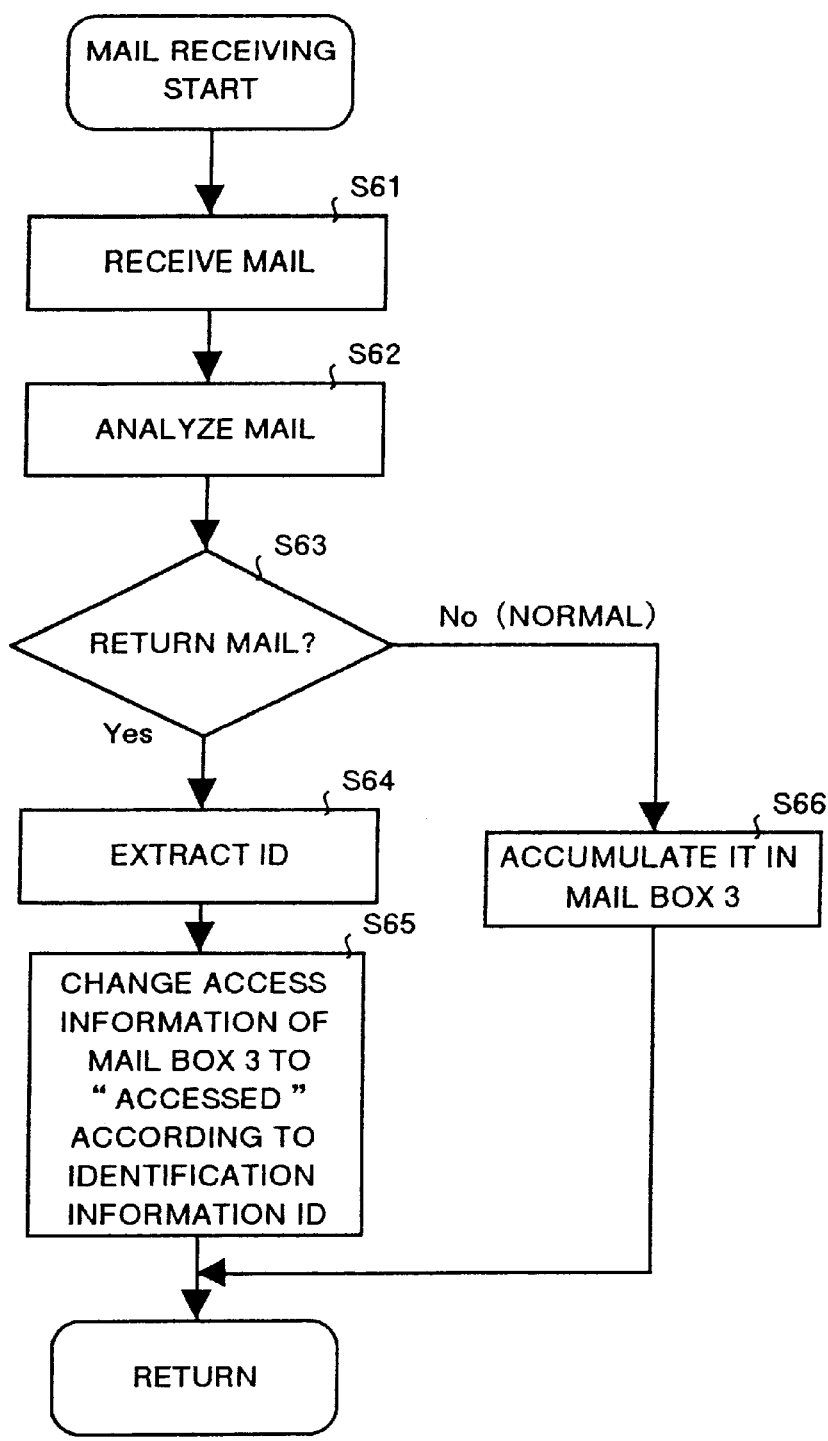
FIG. 9 is a flow chart illustrating an operation of receiving a mail message by a mail server according to one embodiment of the present invention.

Then, description is made for receiving operations. FIG. 9 is a flow chart for explanation of an example of mail receiving operations in the mail server according to the embodiment. When the operation of mail reception is started, at first, in step S61, a mail is received (mail receiving section 26). Then, in step S62, the received mail is analyzed.

More specifically, as shown in FIG. 3B, when mail classified information CLS indicating a return mail exists in the subject information SUB of the header section HDR, the received mail is determined as the return mail RM (step S63). Namely, this mail reception is accepted as a response to access acknowledgement in the transmitted mail EML which has been transmitted.

In this case, the processing goes to step S64, and identification information ID is extracted from the received return mail RM therein. Then, in step S65, the mail box 3 is accessed, and among the transmitted mail managing information having been added thereto as a record, access information of the transmitted mail managing information having the identification information ID extracted in step S64 is changed from a state in which the mail has not been accessed nor read (flag "0") to a state in which the mail has been accessed and read (flag "1"). Then, the processing returns to the main processing.

It should be noted that, in step S63, when the currently received mail is not a return mail RM like ordinary mails, the processing proceeds to step S66 and the mail is accumulated in the mail box 3 as a received mail according to the ordinary operation of receiving mails. After the step, the processing returns to the main processing.

Figure 10:
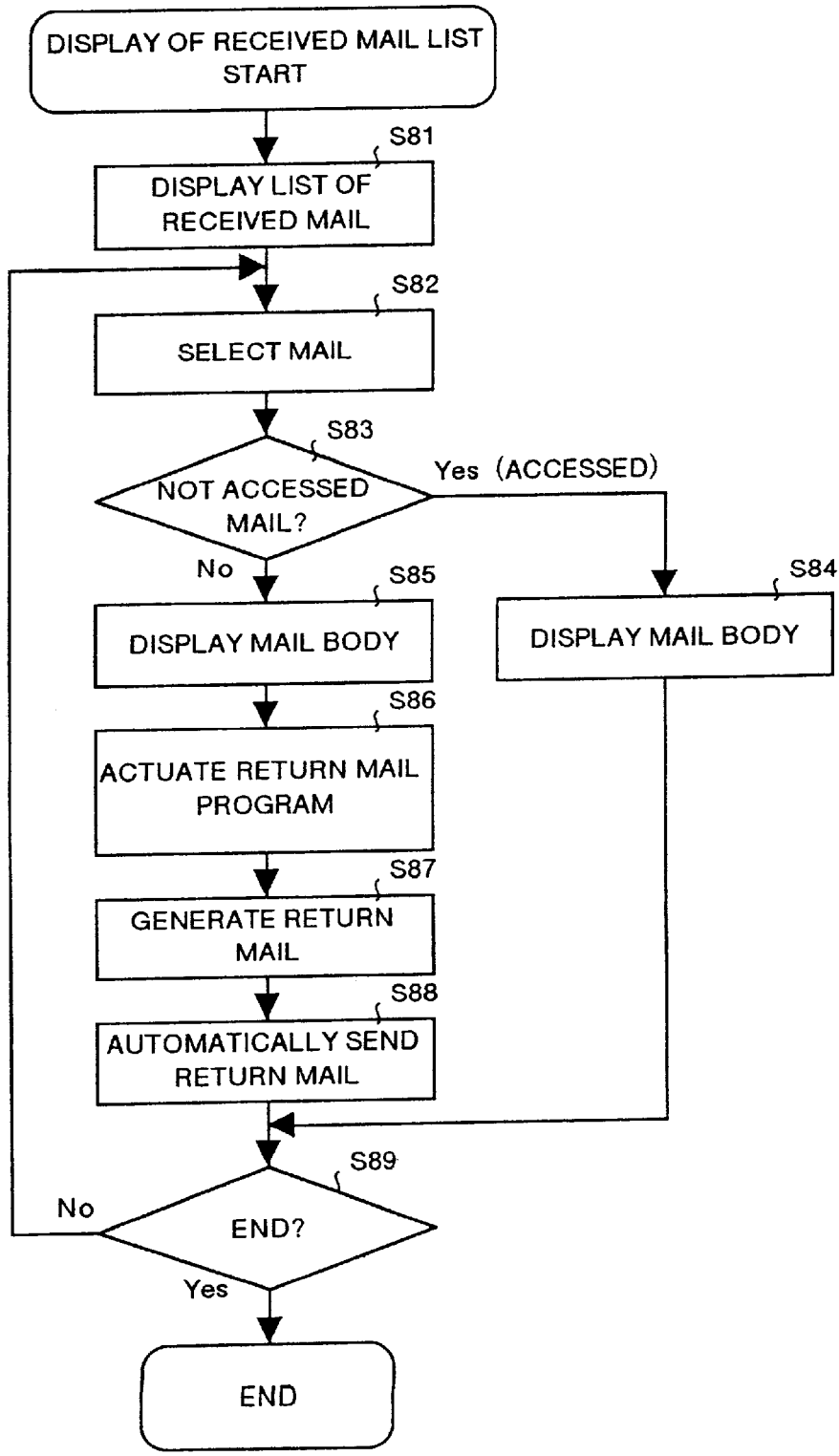
FIG. 10 is a flow chart illustrating processing for displaying mail messages for a client in a list form according to one embodiment of the present invention.

Herein, description is made for the main operations in the client side. FIG. 10 is a flow chart for explaining the display processing of a list of received mails in the client according to the embodiment. Herein, it is assumed that a transmitted mail EML addressed to a client 10 is sent from the mail server 2 to be accumulated in a mail box 9 according to control by the mail server 8 and the transmitted mail EML is received by the client 10 (but, the mail has not been accessed nor read).

In the client 10, when a list of received mails is pointed by key operation in a state where the WWW browser has been actuated, the list of the mails previously received in the RAM 203 is displayed on the display section 205 (step S81). Further, when a desired received mail is selected from the list of the received mails on the screen (step S82) and if the selected mail has already been accessed (step S83), the mail body thereof is displayed on the display section 205 (step S84).

However, when the selected mail has not been accessed (step S83), the transmitted mail EML is accessed and read in the usual way, namely the main body BDY is accessed and the mail body MBDY is displayed on the display section 205 (step S86). In the transmitted mail EML accessed and read in this step, concurrently when the main body BDY is accessed namely when the mail body MBDY is displayed thereon, the return mail program RMP constituting the main body BDY is automatically actuated without any operation performed by the user in the client 10 (step S86), and the return mail RM (Refer to FIG. 3B) is automatically generated (step S87).

Furthermore, this return mail RM is automatically returned to the previously set site as a destination for returning (mail server 2) (step S88). Each of the operations from step S86 to step S88 as described above is executed by detecting the access operation in step S85 as an event of sending the return mail. After the step and onwards, the operations from step S82 to step S88 are repeated until the operation to be ended is executed (step S89).

Figure 11:
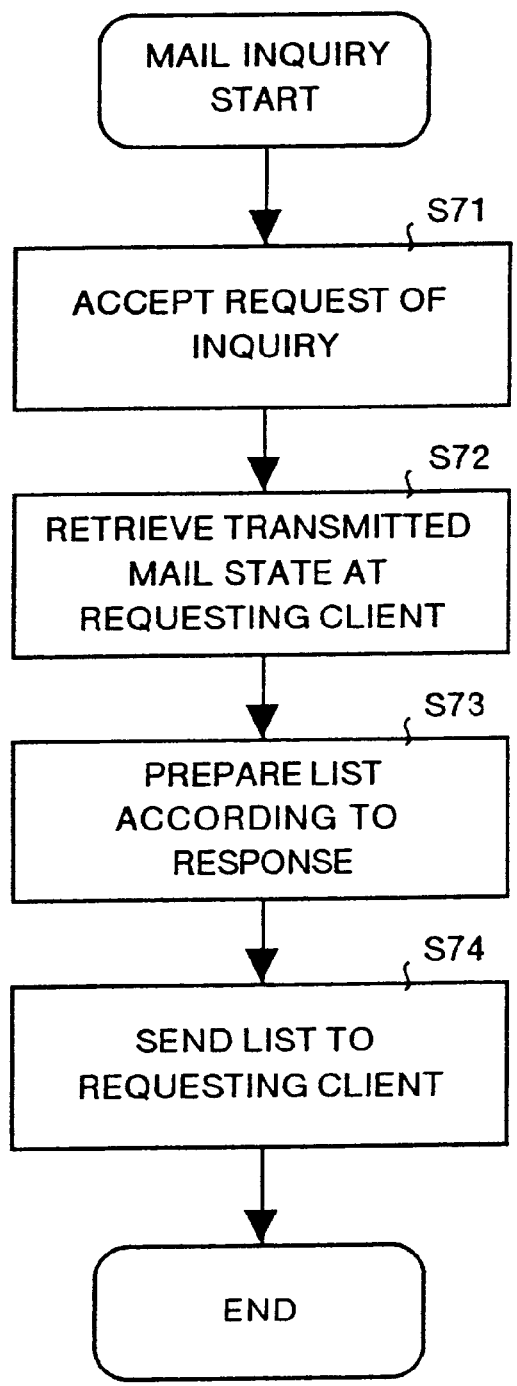
FIG. 11 is a flow chart illustrating an operation for inquiry by a mail server according to one embodiment of the present invention.

Next description is made for operations of mail inquiry in the mail server 2. FIG. 11 is a flow chart for explanation of an example of inquiry operations in the mail server 2 according to the embodiment. FIG. 12 is a view showing an example of a list indicating a result of the inquiry in the embodiment.

In the inquiry operations, as shown in FIG. 11, first, when an inquiring request is accepted in step S71 (transmitted mail state inquiring section 28), then the mail box 3 is accessed in step S72, and transmitted mail managing information indicating that the requesting client is a sender is retrieved (transmitted mail state inquiring section 28). At that time, the mail box 3 returns, when the transmitted mail managing information for the requesting client is detected, the transmitted mail managing information to the mail server 2 as a response.

Then, in step S73, when the response of the transmitted mail managing information is accepted from the mail box 3, a list is prepared according to the transmitted mail managing information for being sent to the requesting client. Then, in step S74, the list is sent to the requesting client.

For instance, when a user of the requesting client is a sender A (Refer to FIG. 5), a list LST is prepared as shown in FIG. 12 according to the transmitted mail managing information 31. Namely, as a result of the transmitted mail state inquiry, when a transmitted mail is sent to a receiver D at 15:30 on February 1 (subject: "Report, part 2"), the transmitted mail indicates that the mail has not been accessed yet according to the access information. On the other hand, when a transmitted mail is sent to the receiver D at 14:30 on February 1 (subject: "Report, part 1"), the transmitted mail indicates that the mail has been accessed and read according to the access information.

It should be noted that this inquiry is executed just by accessing a desired address in the mail server 2 (in this case, the address is URL (Uniform Resource Locator)) from any WWW browser. Thus a response thereto is obtained by sending the list LST converted to a HTML (Hypertext Markup Language) format by the mail server 2 to the WWW browser.

As described above, with the embodiment, identification information and access information indicating a mail body which is not accessed nor read at a destination terminal are stored and managed in the server in correlation with the mail. At the time of transmitting the mail, a transmitted mail is sent having program information actuated to return by mail, when the mail body is accessed at the destination terminal, the access acknowledgement and the identification information of the mail to the server. When a judgment of access acknowledgement is obtained from the destination terminal according to the received mail, identification information is extracted from the received mail and the access information of the transmitted mail corresponding to the identification information is changed to an access state. Thus the destination terminal just accesses the mail body to return the access acknowledgement. For this reason, it is not required to add any other particular function (hardware or software) for access acknowledgement to a destination terminal or to a destination electronic mail server. Thus, only a small-scale upgrade just for the transmitting electronic mail server is needed, and changing operation from a mail which is not accessed to an access state thereof is simplified using identification information. Accordingly, it is possible to enhance the establishment of access acknowledgement thereof in the receiving site while reducing the required upgrading of existing systems.

Also, when an inquiring request for the stored and managed contents is accepted from any terminal, the contents corresponding to the terminal requiring for the inquiring request is retrieved according to the acceptance and a result of the retrieval is returned thereto. Thus, it is possible to supply an access state of the transmitted mail stored and managed in the server at a real time.

Program information is generated according to a transmission request from any terminal. Thus an operation to prepare program information is executed only when a mail is prepared. With this operation, it is possible to reduce the system load due to control at the time other than that of preparing the mail.

By the way, in the embodiment described above, when the same mails are transmitted to a plurality of clients at the same time, the following operations may be executed for the purpose of lowering traffic of the network 1. Namely, (1) Concerning the same mails, actuation of the return mail program RMP by a client side can be so switched as to be authorized or unauthorized.
(2) Concerning a CC (carbon copy), attachment of the return mail program RMP thereto can be so switched as to be authorized or unauthorized.
(3) Concerning the same mails more than the previously set number of destinations for transmission, attachment of the return mail program RMP thereto can automatically be switched so as to be unauthorized on the mail server.

The following operations may be executed to prevent records for acknowledgement of an access state from unlimited increasing. Namely, (1) A maximum value of the number of records is previously decided as an arbitrary value or as a fixed value, and when the number of records exceeds the maximum value as a reference, the records are deleted in the order of older transmission dates first (the item of date and time shown in FIG. 5).
(2) A duration of each of records to be kept is previously decided as an arbitrary period of time or as a fixed period of time, and when the duration of the records to be kept exceeds the decided period of time, the records are deleted in the order of older transmission dates first (the item of date and time shown in FIG. 5).
(3) The record in an access state of the return mail RM having been returned is deleted.
(4) The records in which mails are not accessed are preferentially left, and the deleting operation of (1) or (2) described above is executed to any of the records in the access state.

Now, in the embodiment described above, a transmitted time of a transmitted mail is managed as management of a date and a time, but separately from the transmitted time, a date and a time (accessed time) on which the return mail RM is returned may also be stored and managed in the server. As described above, if the accessed time is managed, it is possible to take steps according to a degree of importance in each of transmitted mails obtained from the difference between the transmitted time and the accessed time.

Also, in the embodiment, the transmission of a mail and returning of the return mail between the mail servers 2 and 8 are taken as an example for description. However, it is needless to say that the same operations of transmitting a mail and returning the return mail can be realized in the LAN connected to the mail server 2 or to the mail server 8.

In the embodiment, it is taken as an example for description that the function shown in FIG. 2 is incorporated in a mail server. However, the present invention is not restricted thereto, so that a server having configuration shown in FIG. 2 may be connected to a line between a mail server and a client separate from the mail server. In this case, the same effect can also be obtained as that in the embodiment.

As described above, with the present invention, when a mail message is transmitted, a transmitted mail has program information actuated to return, when the main body of the mail message is accessed and read at a destination terminal, an acknowledgement that the mail message was accessed and read to the transmitting device. When information as to whether the mail message has been accessed and read or not is obtained from the destination terminal according to the received mail message, the result of transmitting the transmitted mail message is stored as data indicating that the mail message was accessed and read. Thus, there is provided the advantage that the destination terminal is required only to access and read the main body of the mail message for returning a response confirming that the mail was accessed and read. For this reason it is not required to add any specific function for checking whether a transmitted mail message has been accessed and read or not to a destination terminal or a destination electronic mail server. Accordingly it is possible to provide an electronic mail server which can improve accuracy in checking whether a transmitted mail message has been accessed and read or not in the receiving site with the necessity of upgrading the existing system reduced.

With the present invention, when a mail message is transmitted, a transmitted mail message has program information actuated to return, when the main body of the mail message is accessed and read at the destination terminal, an acknowledgement by mail that the mail message has been accessed and read as well as identification information for the mail message to the transmitting site. When information as to whether the mail message has been accessed and read or not is obtained from the destination terminal according to the received mail, the identification information is extracted from the received mail message and a result of transmitting the transmitted mail corresponding to the identification information is stored as information indicating that the transmitted mail message was accessed and read. Thus, there is provided the advantage that the destination terminal is only required to open the main body of the mail message for returning acknowledgement of access. For this reason, it is not necessary to add any specified function for confirming that a transmitted mail message has been accessed and read to a destination terminal or a destination electronic mail server. Further an operation for distinguishing a transmitted mail message not accessed yet from a transmitted mail message already accessed is simplified according to the identification information. It is possible to provide an electronic mail server which can improve accuracy in checking whether a transmitted mail message has been accessed and read or not in the receiving site with the necessity for upgrading the existing system reduced.

With the present invention, identification information and access information indicating that the main body of a transmitted mail message has not been accessed nor read is stored at a destination terminal in correspondence to each mail message. When a mail message is transmitted, a transmitted mail message is transmitted having program information actuated to return, when the main body of the mail message has been accessed and read at the destination terminal, an acknowledgement by mail that the mail message has been accessed and read as well as identification information for the mail message to the transmitting site. When a confirmation that the mail message has been accessed and read is obtained from the destination terminal according to the received mail message, identification information is extracted from the received mail message and access information for the transmitted mail message corresponding to the identification information is changed to information indicating that the mail message has been accessed and read. Thus, there is provided the advantage that the destination terminal is required for returning acknowledgement of access only to open the main body of the mail message. For this reason, it is not necessary to add any specific function for checking whether a transmitted mail message has been accessed and read or not to the destination terminal or the destination electronic mail servers. Further an operation for changing information indicating that a transmitted mail message has not been accessed nor read to information indicating that the mail message has been accessed and read is simplified by using the identification information. It is possible to provide an electronic mail server which can improve the accuracy in checking that a transmitted mail message has been accessed and read in the receiving site with the necessity of upgrading the existing system reduced.

With the present invention, when a request for inquiring contents stored and managed is accepted from a terminal, contents corresponding to the terminal having sent the request for inquiry is searched according to the acceptance, and a result of the search is returned. Thus, it is possible to provide an electronic mail server which can supply real time access information for any transmitted mail message stored and managed in the system.

With the present invention, program information is generated in response to a request for transmission from a terminal, so that an operation for preparing program information is executed only when a mail is prepared. With this feature, it is possible to provide an electronic mail server in which system load for operations other than mail preparation can be alleviated.

With the present invention, an electronic mail server transmits a transmitted mail message having program information actuated to return, when the main body of the mail message is accessed and read at a destination terminal, an acknowledgement by mail that the mail message has been accessed and read to the device. When a terminal receives the transmitted mail message, the terminal executes an operation for returning a response according to the program information actuated when the main body of the transmitted mail message is accessed and read. In the site of an electronic mail server, when information indicating that the transmitted mail message has been accessed and read is obtained, after a mail is transmitted, from the destination terminal according to the received mail message, a result of transmission of the transmitted mail message is stored as information indicating that the transmitted mail message was accessed and read. Thus, the destination terminal is required for returning a response indicating that the transmitted mail message has been accessed and read only to open the main body of the mail. For this reason, it is not necessary to add any specific function for confirming that a transmitted mail message has been accessed and read to the destination terminal or a destination electronic mail server. Only a small scale upgrade of the transmitting electronic mail server is required. Accordingly it is possible to provide an electronic mail system which can improve the accuracy in checking that a transmitted mail message has been accessed and read in the receiving site with the necessity for upgrading the existing system reduced.

With the present invention, an electronic mail server transmits a transmitted mail message having program information actuated to return, when the main body of a mail message is accessed and read at a destination terminal, an acknowledgement by mail that the mail message has been accessed and read as well as identification information for the mail message to the server. When a terminal receives the transmitted mail message, the terminal executes, an operation for returning a response according to the program information actuated when the main body of the transmitted mail message is accessed and read. In the site of the electronic mail server, after a mail message is transmitted, when information indicating that the mail message has been accessed and read is obtained from a destination terminal according to the received mail message, identification information is extracted from the received mail message and a result of transmission of a transmitted mail message corresponding to the identification information is stored as information indicating that the mail message was accessed and read. Thus, the destination terminal is required for returning acknowledgement of access only to access and read the main body of the transmitted mail message. For this reason it is not necessary to add any specific function for confirming that a transmitted mail message has been accessed and read to a destination terminal or to a destination electronic mail server. Only a small scale upgrade of an electronic mail server in the transmitting site is required. Further an operation for distinguishing a transmitted mail message not accessed yet from that already accessed is simplified according to the identification information. For this reason it is possible to provide an electronic mail system which can improve the accuracy in checking whether a transmitted mail message has been accessed and read or not in the receiving site with the necessity to upgrade the existing system reduced.

With the present invention, an electronic mail server stores therein and manages identification information as well as access information indicating that the main body of a mail message has not been accessed nor read at a destination terminal in correspondence to each mail message. When a mail message is transmitted, a transmitted mail message is transmitted having program information actuated to return, when the main body of the mail is accessed and read at the destination terminal, an acknowledgement by mail that the mail message has been accessed and read as well as identification information for the mail message to the server. When a terminal receives the transmitted mail message, the terminal executes an operation for returning a response according to the program information actuated when the main body of the transmitted mail is accessed and read. In the site of the electronic mail server, after a mail message is transmitted, when information indicating that the mail message has been accessed and read is obtained from the destination terminal according to the received mail message, identification information is extracted from the received mail message and access information for a transmitted mail message corresponding to the identification information is changed to information indicating that the mail message was accessed and read. Thus the destination terminal is required for returning acknowledgement of access only to access and read the main body of the mail. For this reason, it is not necessary to add any specific function for acknowledgement of access to the destination terminal or the destination electronic mail servers. Only small scale upgrade of the electronic mail server in the transmitting site is required. Further an operation for changing information indicating that a transmitted mail message has not been accessed nor read to information indicating that the mail message has been accessed and read is simplified by using the identification information. Accordingly it is possible to provide an electronic mail system which can improve the accuracy in checking that a transmitted mail message has been accessed and read in the receiving site with the necessity for upgrading the existing system reduced.

With the present invention, an electronic mail server transmits a transmitted mail message having program information actuated to return, when the main body of a mail message is accessed and read at a destination terminal, an acknowledgement that the mail has been accessed and read to the server. When the terminal receives the transmitted mail message, the terminal executes an operation for returning acknowledgement of access according to the program information actuated when the main body of the transmitted mail is accessed and read. In the site of the electronic mail server, after a mail message is transmitted, a result of transmission of the transmitted mail is stored as information indicating that the mail message was accessed and read according to the acknowledgement of access in a returned mail message. Thus, the destination terminal is required for returning a response indicating that the mail message has been accessed and read only to access and read the main body of the mail message. Thus, any specific operation after a mail message is accessed and read is not required for a destination terminal or a destination electronic mail server. For this reason, it is provided an electronic mail access acknowledging method in which it is possible to improve the accuracy in checking that a mail message has been accessed and read in the receiving site with the necessity for upgrading the existing system reduced.

With the present invention, an electronic mail server transmits a transmitted mail message having program information actuated to return, when the main body of the mail is accessed and read at a destination terminal, an acknowledgement by mail that the mail message has been accessed and read as well as identification information for the mail message to the server. When the terminal receives the transmitted mail message, the terminal executes an operation for returning a response according to the program information actuated when the main body of the transmitted mail is accessed and read. In the site of the electronic mail server, identification information is extracted from the mail message according to acknowledgement of access in a mail message received after the mail message is transmitted, and a result of transmission of the transmitted mail message corresponding to the identification information is stored as information indicating that the mail message was accessed and read. Thus, the destination terminal is required for returning a response that the mail message was accessed and read only to access and read the main body of the mail. For this reason any specific operation for confirming that a transmitted mail message has been accessed and read is not required for a destination terminal or a destination electronic mail server. Further an operation for distinguishing a transmitted mail message not accessed nor read yet from a transmitted mail message already accessed and read is simplified according to the identification information. For this reason it is possible to provide an electronic mail access acknowledging method in which it is possible to improve the accuracy in checking that a transmitted mail message has been accessed and read in the receiving site with the necessity for upgrading of the existing system reduced.

With the present invention, an electronic mail server stores therein and manages identification information and access information indicating that the main body of a transmitted mail message has not been accessed nor read at a destination terminal in correspondence to each mail message. When a mail message is transmitted, the electronic mail server transmits a transmitted mail message having program information actuated to return, when the main body of the mail is accessed and read at a destination terminal, an acknowledgement by mail that the transmitted mail message has been accessed and read as well as identification information for the mail message to the server. When the terminal receives the transmitted mail message, the terminal executes an operation for returning a response according to the program information actuated when the main body of the mail is accessed and read. In the site of the electronic mail server, identification information is extracted from the mail message, according to the access acknowledgement in a mail message received after the mail message is transmitted. The access information for a transmitted mail message corresponding to the identification information is changed to information indicating that the mail message has been accessed and read. Thus the terminal is required for returning a response indicating that the transmitted mail message has been accessed and read only to access and read the main body of the mail. For this reason any specific operation for confirming that a transmitted mail message has been accessed and read is not required for a destination terminal nor for a destination electronic mail server. Further an operation for changing the information indicating that a transmitted mail message has not been accessed nor read to information indicating that the transmitted mail message has been accessed and read is simplified by using the identification information. Accordingly it is provided an electronic mail access acknowledging method in which it is possible to improve the accuracy in checking that a transmitted mail message has been accessed and read in the receiving site with the necessity for upgrading the existing system reduced.

With the invention, a program causing a computer execute any of the above methods is recorded, so that the program can be read by machine. With this feature it is possible to provide a computer-readable medium in which a program causing a computer execute any of the steps according to the above invention is recorded.

This application is based on Japanese patent application No. HEI 9-36229 filed in the Japanese Patent Office on Feb. 20, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electronic mail server used in a distributed type of network with a plurality of networked electronic mail servers each having terminals connected thereto comprising:

a preparing means for preparing a transmitted mail message, when a submitted mail message is received from one of the terminals connected thereto, according to the submitted mail message and program information actuated to return, when the main body of the transmitted mail message is accessed and read at a destination terminal, an acknowledgement by mail of the access to the electronic mail server;

a return mail program generating means for generating the program information;

a transmitting means for transmitting the transmitted mail message prepared by said preparing means;

a judging means for judging whether or not a mail message received, after said transmitted mail message is transmitted by said transmitting means, is acknowledgement that the transmitted mail message has been accessed and read, which is returned from said destination terminal in response to actuation of said program information; and a storing means for storing therein, when it is judged by the judging means that the mail message is the acknowledgement that the mail message has been accessed and read, a result of a transmission of the transmitted mail message prepared by said preparing means as information indicating that the transmitted mail message was accessed and read.

2. An electronic mail server according to claim 1; wherein said preparing means has a generating means for generating said program information in response to a request of transmission from a terminal connected to said distributed type of network.

3. An electronic mail server used in a distributed type of network with a plurality of networked electronic mail servers each having terminals connected thereto comprising:

a setting means for setting identification information for identifying a submitted mail message as an object for transmission when the submitted mail message is received from one of the terminals connected thereto;

a preparing means for preparing a transmitted mail message according to said submitted mail message, the identification information set by said setting means, and program information actuated to return a mail message including access acknowledgement and said identification information to the electronic mail server when a main body of the transmitted mail message is accessed and read at a destination terminal;

a return mail program generating means for generating the program information based on said identification information;

a transmitting means for transmitting the transmitted mail message prepared by said preparing means;

a judging means for judging whether a mail message received after said transmitted mail message is transmitted by said transmitting means is an acknowledgement that the transmitted mail message has been accessed and read, which is returned in response to actuation of said program information from said destination terminal;

an extracting means for extracting said identification information set by said setting means from said received mail when it is judged by said judging means that the received mail is the acknowledgement that the transmitted mail message has been accessed and read; and a storing means for storing therein a result of transmission of the transmitted mail message prepared by said preparing means and corresponding to the identification information extracted by said extracting means as information indicating that the transmitted mail message was accessed and read.

4. An electronic mail server according to claim 3; wherein said preparing means has a generating means for generating said program information in response to a request of transmission from a terminal connected to said distributed type of network.

5. An electronic mail server used in a distributed type of network with a plurality of networked electronic mail servers each having terminals connected thereto comprising:

a setting means for setting identification information for identifying a submitted mail message as an object for transmission when the submitted mail message is received from one of the terminals connected thereto;

a storing/managing means for storing therein and managing the identification information set by said setting means in correspondence to said submitted mail message and access information indicating that a main body of the submitted mail message has not been accessed nor read at a destination terminal;

a preparing means for preparing a transmitted mail message according to said submitted mail message, the identification information set by said setting means, and program information actuated to return an acknowledgement mail message including an acknowledgment of access and said identification information to the electronic mail server when the main body of the transmitted mail message is accessed and read at the destination terminal;

a return mail program generating means for generating the program information based on said identification information;

a transmitting means for transmitting the transmitted mail message prepared by said preparing means;

a judging means for judging whether or not a mail message received after said transmitted mail message is transmitted by said transmitting means is an acknowledgement that the transmitted mail message has been accessed and read, which is returned in response to actuation of said program information from said destination terminal;

an extracting means for extracting the identification information set by said setting means from said received mail message when it is judged by said judging means that the received mail message is the acknowledgement that the transmitted mail message has been accessed and read; and a changing means for changing access information concerning a mail message having the identification information extracted by said extracting means from among mail messages stored in and managed by said storing/managing means to an access state.

6. An electronic mail server according to claim 5 further comprising:

an inquiring request accepting means for accepting a request for inquiring the contents stored in and managed by said storing/managing means from a terminal connected to said distributed type of network, a retrieving means for retrieving contents corresponding to said terminal in response to acceptance by said inquiring request accepting means;

a responding means for returning a result of retrieval by said retrieving means to said terminal through said distributed type of network.

7. An electronic mail server according to claim 5; wherein said preparing means has a generating means for generating said program information in response to a request of transmission from a terminal connected to said distributed type of network.

8. An electronic mail system comprising a distributed type of network, a plurality of networked electronic mail servers connected to said distributed type of network, and a plurality of terminals connected to said plurality of electronic mail servers; wherein each of said electronic mail servers has:

a preparing means for preparing a transmitted mail message, when a submitted mail message is received from one of the terminals connected thereto, according to the submitted mail message and program information actuated to return, when a main body of the transmitted mail message is accessed and read at a destination terminal, an acknowledgement by mail that the transmitted mail message has been accessed and read to the electronic mail server;

a return mail program generating means for generating the program information at the electronic mail server;

a transmitting means for transmitting the transmitted mail message prepared by said preparing means to the electronic mail server to which the destination terminal is connected among said plurality of electronic mail servers;

a judging means for judging whether or not a mail message received, after said transmitted mail message is transmitted by said transmitting means, is an acknowledgement that the transmitted mail message has been accessed and read, which is returned in response to actuation of the program information from said destination terminal; and a storing means for storing a result of transmission of the transmitted mail message prepared by said preparing means as information that the transmitted mail message has been accessed and read when it is judged by said judging means that the transmitted mail message is an acknowledgement that the transmitted mail message has been accessed and read;

wherein each said terminal returns a response according to the program information actuated when the main body of said received mail message transmitted thereto is accessed and read when the transmitted mail message transmitted from said transmitting means is received from an electronic mail server, from among said plurality of network electronic mail servers, to which the destination terminal is connected.

9. An electronic mail system comprising a distributed type of network, a plurality of networked electronic mail servers connected to said distributed type of network, and a plurality of terminals connected to said plurality of networked electronic mail servers; wherein said each electronic mail server comprises:

a setting means for setting, when a submitted mail is received from one of the terminals connected thereto, identification information for identifying the submitted mail message as an object for transmission;

a preparing means for preparing a transmitted mail message according to said submitted mail message, the identification information set by said setting means, and program information actuated to return a mail message including an acknowledgement that the transmitted mail message has been accessed and read and said identification information to a networked electronic mail server when a main body of the transmitted mail message is accessed and read at a destination terminal;

a return mail program generating means for generating the program information based on said identification information;

a transmitting means for transmitting the transmitted mail message prepared by said preparing means to an electronic mail server, from among said plurality of networked electronic mail servers, to which said destination terminal is connected;

a judging means for judging whether or not a mail message received after said transmitted mail message is transmitted by said transmitting means comprises information that the transmitted mail message has been accessed and read, said received mail message returned in response to actuation of said program information from said destination terminal;

an extracting means for extracting the identification information set by said setting means from said received mail message when it is judged by said judging means that the received mail is an acknowledgement that the transmitted mail message has been accessed and read; and a storing means for storing a result of a transmission of the transmitted mail message prepared by said preparing means and corresponding to the identification information extracted by said extracting means as information that the transmitted mail message has been accessed and read;

wherein each said terminal returns a response according to the program information actuated when the main body of said transmitted mail message transmitted thereto is accessed and read when a transmitted mail message transmitted by said transmitting means is received from the electronic mail server, of said plurality of networked electronic mail servers, to which the terminal is connected.

10. An electronic mail system comprising a distributed type of network, a plurality of electronic mail servers connected to said distributed type of network, and a plurality of terminals connected to said plurality of electronic mail servers; wherein said each electronic mail server comprises:

a setting means for setting, when a submitted mail message is received from one of the terminals connected thereto, identification information for identifying the submitted mail message as an object for transmission;

a storing/managing means for storing therein and managing the identification information set by said setting means in correspondence to said submitted mail message and access information indicating that a main body of the submitted mail message has not been accessed nor read at a destination terminal;

a preparing means for preparing a transmitted mail message according to said submitted mail message, the identification information set by said setting means, and program information actuated to return by mail an access acknowledgement and said identification information to the server when the main body of the transmitted mail message is accessed and read at a destination terminal;

a return mail program generating means for generating the program information based on said identification information;

a transmitting means for transmitting the transmitted mail message prepared by said preparing means to an electronic mail server, of said plurality of electronic mail servers, to which said destination terminal is connected;

a judging means for judging whether or not a mail message received after said transmitted mail message is transmitted by said transmitting means is an access acknowledgement returned in response to actuation of said program information from said destination terminal;

an extracting means for extracting identification information set by said setting means from said received mail message it is judged by said judging means that the received mail message is an acknowledgement that the transmitted mail message has been accessed and read; and a changing means for changing access information for a mail message including the identification information extracted by said extracting means from among mail message stored in and managed by said storing/managing means to an accessed state;

wherein each said terminal returns a response according to the program information actuated when the main body of the transmitted mail message is accessed and read when said transmitted mail message transmitted from said transmitting means is received from the electronic mail server, of said a plurality of electronic mail servers, to which the terminal is connected.

11. An electronic mail access acknowledging method applied to an electronic mail system comprising a distributed type of network, a plurality of networked electronic mail servers connected to said distributed type of network, and a plurality of terminals connected to said plurality of networked electronic mail servers, said method comprising the steps of:

receiving a submitted mail message at a transmitting electronic mail server of said plurality of networked electronic mail servers from one of the terminals connected thereto;

preparing a transmitted mail message, according to the submitted mail message as an object for transmission and to program information actuated to return, when a main body of the transmitted mail message is accessed and read at a destination terminal, an acknowledgement by mail of the access to the transmitting electronic mail server;

generating the program information at the electronic mail server;

a transmitting step of transmitting the transmitted mail message to a destination electronic mail server, of said plurality of networked electronic mail servers, to which the destination terminal is connected from said transmitting electronic mail server;

receiving a mail message returned according to the program information actuated when the main body of the transmitted mail message is accessed and read when said destination terminal receives the transmitted mail message from said destination electronic mail server; and storing, as information that the transmitted mail message has already been accessed and read, a result of a transmission of the transmitted mail message according to an access acknowledgement in the returned mail message on said transmitting electronic mail server.

12. A computer-readable medium having stored thereon a program causing a computer to execute an electronic mail access acknowledging method applied to an electronic mail system comprising a distributed type of network, a plurality of networked electronic mail servers connected to said distributed type of network, and a plurality of terminals connected to said plurality of networked electronic mail servers, said method comprising the steps of:

receiving a submitted mail message at a transmitting electronic mail server of said plurality of networked electronic mail servers from one of the terminals connected thereto;

preparing a transmitted mail message, according to the submitted mail message as an object for transmission and to program information actuated to return, when a main body of the transmitted mail message is accessed and read at a destination terminal, an acknowledgement by mail of the access to the transmitting electronic mail server;

generating the program information at the electronic mail server;

a transmitting step of transmitting the transmitted mail message to a destination electronic mail server, of said plurality of networked electronic mail servers, to which the destination terminal is connected from said transmitting electronic mail server;

receiving a mail message returned according to the program information actuated when the main body of the transmitted mail message is accessed and read when said destination terminal receives the transmitted mail message from said destination electronic mail server; and storing, as information that the transmitted mail message has already been accessed and read, a result of a transmission of the transmitted mail message according to an access acknowledgement in the returned mail message on said transmitting electronic mail server.

13. An electronic mail access acknowledging method applied to an electronic mail system comprising a distributed type of network, a plurality of networked electronic mail servers connected to said distributed type of network, and a plurality of terminals connected to said plurality of networked electronic mail servers, said method comprising the steps of:

receiving a submitted mail message at a transmitting electronic mail server of said plurality of networked electronic mail servers from one of the terminals connected thereto;

setting identification information for identifying the submitted mail message as an object for transmission on said transmitting electronic mail server;

preparing a transmitted mail message, on said transmitting electronic mail server, according to said submitted mail message, the identification information, and program information actuated to return a mail message including an acknowledgement of the access and said identification information to the transmitting electronic mail server when the main body of the transmitted mail message is accessed and read at a destination terminal;

generating the program information at the electronic mail server based on the identification information;

transmitting the transmitted mail message to a destination electronic mail server, of said plurality of networked electronic mail servers, to which said destination terminal is connected from said transmitting electronic mail server;

receiving a returned mail message, when said destination terminal receives the transmitted mail message from said electronic mail server as a destination for transmission according to program information actuated when the mail body of the transmitted mail message is accessed and read;

extracting the identification information from the returned mail message according to an access acknowledgement in the returned mail on the transmitting electronic mail server; and storing, as information that the transmitted mail message has already been accessed and read, a result of a transmission of the transmitted mail message in correspondence to the identification information on said transmitting electronic mail server.

14. A computer-readable medium having stored thereon a program causing a computer to execute an electronic mail access acknowledging method applied to an electronic mail system comprising a distributed type of network, a plurality of networked electronic mail servers connected to said distributed type of network, and a plurality of terminals connected to said plurality of networked electronic mail servers, said method comprising the steps of:

receiving a submitted mail message at a transmitting electronic mail server of said plurality of networked electronic mail servers from one of the terminals connected thereto;

setting identification information for identifying the submitted mail message as an object for transmission on said transmitting electronic mail server;

preparing a transmitted mail message, on said transmitting electronic mail server, according to said submitted mail message, the identification information, and program information actuated to return a mail message including an acknowledgement of the access and said identification information to the transmitting electronic mail server when the main body of the transmitted mail message is accessed and read at a destination terminal;

generating the program information at the electronic mail server based on the identification information;

transmitting the transmitted mail message to a destination electronic mail server, of said plurality of networked electronic mail servers, to which said destination terminal is connected from said transmitting electronic mail server;

receiving a returned mail message, when said destination terminal receives the transmitted mail message from said electronic mail server as a destination for transmission according to program information actuated when the mail body of the transmitted mail message is accessed and read;

extracting the identification information from the returned mail message according to an access acknowledgement in the returned mail on the transmitting electronic mail server; and storing, as information that the transmitted mail message has already been accessed and read, a result of a transmission of the transmitted mail message in correspondence to the identification information on said transmitting electronic mail server.

15. An electronic mail access acknowledging method applied to an electronic mail system comprising a distributed type of network, a plurality of networked electronic mail servers connected to said distributed type of network, and a plurality of terminals connected to said plurality of networked electronic mail servers, said method comprising the steps of:

receiving a submitted mail message at a transmitting electronic mail server of said plurality of networked electronic mail servers from one of the terminals connected thereto;

setting identification information for identifying said submitted mail as an object for transmission on said transmitting electronic mail server;

storing and managing the identification information in correspondence to said submitted mail message and access information indicating that a main body of said submitted mail message has not been accessed nor read at a destination terminal on a memory previously prepared on said transmitting electronic mail server;

preparing a transmitted mail message according to submitted said mail message, the identification information, and program information actuated to return a mail message including an access acknowledgement and said identification information to the transmitting electronic mail server when the main body of the transmitted mail message is accessed and read at said destination terminal;

generating the program information at the electronic mail server based on the identification information;

transmitting the transmitted mail message to a destination electronic mail server, of said plurality of networked electronic mail serves, to which the destination terminal is connected from said transmitting electronic mail server;

returning, when said destination terminal receives the transmitted mail message from said destination electronic mail server, said returned mail message according to the program information actuated when the main body of the transmitted mail message is accessed and read;

extracting the identification information from the returned mail message according to the access acknowledgement in the returned mail message on said transmitting electronic mail server; and changing the access information for a mail message having therein the extracted identification information, of mail messages stored and managed on said memory, to the information indicating that the mail message has been accessed and read on said transmitting electronic mail server.

16. A computer-readable medium having stored thereon a program causing a computer to execute an electronic mail access acknowledging method applied to an electronic mail system comprising a distributed type of network, a plurality of networked electronic mail servers connected to said distributed type of network, and a plurality of terminals connected to said plurality of networked electronic mail servers, said method comprising the steps of:

receiving a submitted mail message at a transmitting electronic mail server of said plurality of networked electronic mail servers from one of the terminals connected thereto;

setting identification information for identifying said submitted mail as an object for transmission on said transmitting electronic mail server;

storing and managing the identification information in correspondence to said submitted mail message and access information indicating that a main body of said submitted mail message has not been accessed nor read at a destination terminal on a memory previously prepared on said transmitting electronic mail server;

preparing a transmitted mail message according to submitted said mail message, the identification information, and program information actuated to return a mail message including an access acknowledgement and said identification information to the transmitting electronic mail server when the main body of the transmitted mail message is accessed and read at said destination terminal;

generating the program information at the electronic mail server based on the identification information;

transmitting the transmitted mail message to a destination electronic mail server, of said plurality of networked electronic mail serves, to which the destination terminal is connected from said transmitting electronic mail server;

returning, when said destination terminal receives the transmitted mail message from said destination electronic mail server, said returned mail message according to the program information actuated when the main body of the transmitted mail message is accessed and read;

extracting the identification information from the returned mail message according to the access acknowledgement in the returned mail message on said transmitting electronic mail server; and changing the access information for a mail message having therein the extracted identification information, of mail messages stored and managed on said memory, to the information indicating that the mail message has been accessed and read on said transmitting electronic mail server.

* * * * *